April 13, 1937.  W. T. LEVITT  2,076,903
CONDENSER
Filed Nov. 16, 1935   2 Sheets-Sheet 1
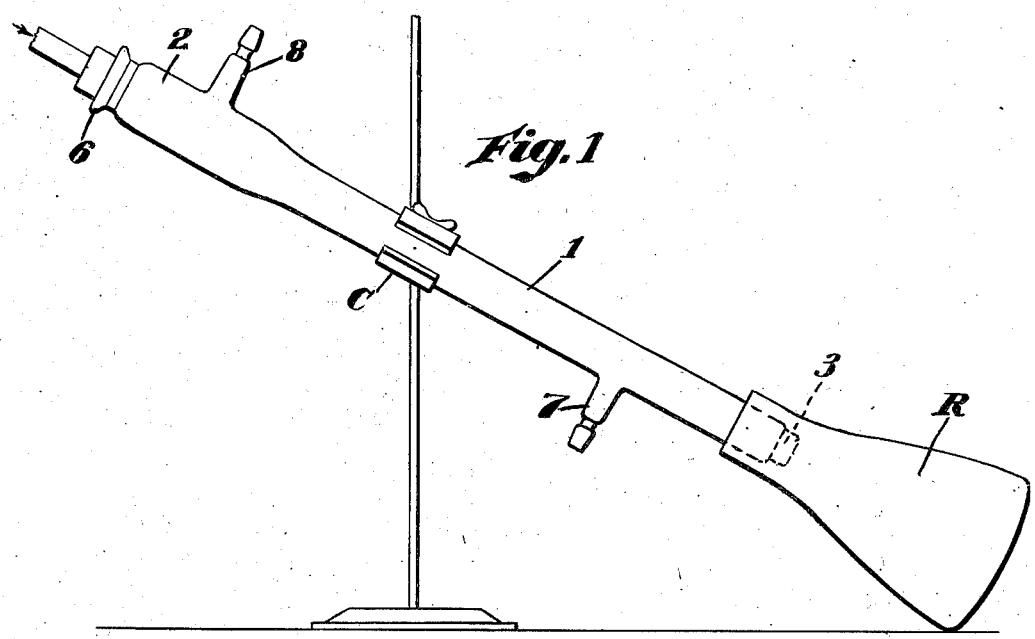
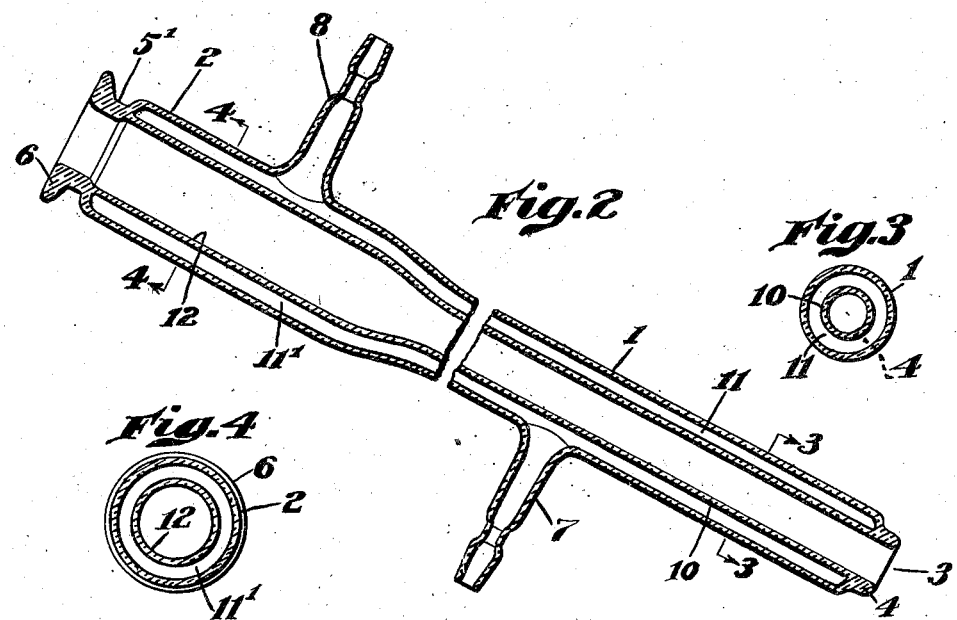
Inventor
William T. Levitt
By Attorney April 13, 1937.  W. T. LEVITT  2,076,903
CONDENSER
Filed Nov. 16, 1935   2 Sheets-Sheet 2
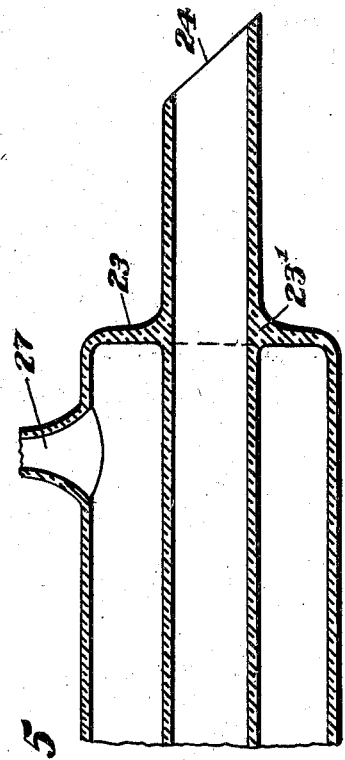
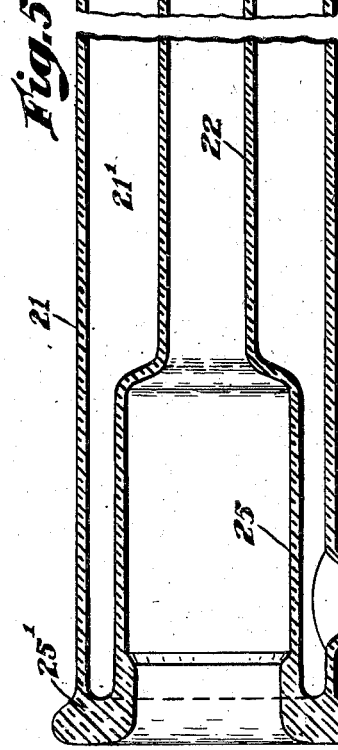
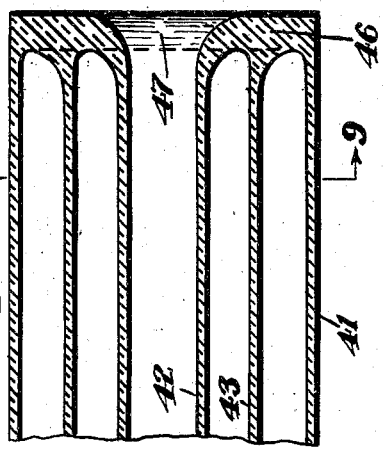
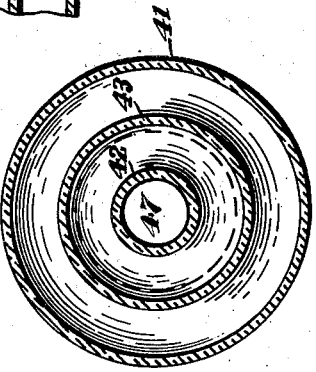
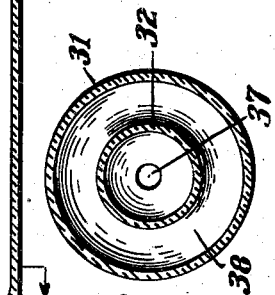
Inventor
William T. Levitt
By Attorney Patented Apr. 13, 1937

2,076,903

UNITED STATES PATENT OFFICE 2,076,903

CONDENSER

William T. Levitt, Needham, Mass., assignor to Tamworth Associates, Inc., Needham Heights, Mass., a corporation of Massachusetts Application November 16, 1935, Serial No. 50,185

4 Claims. (Cl. 23—292)

My present invention relates to improvements in double walled vessels and more particularly to laboratory condensers for distillation or extraction or for reflux in vertical installation or to other jacketed types whether for cooling, heating or for insulation or other temperature control. While my inventions therefore are applicable to a variety of devices or apparatus, I will discuss it from the viewpoint of production of such articles as may be produced by concentric assemblies of concentric tubes, and to the art of their production.

For distillation or extraction purposes for laboratory or other uses, the glass condenser had developed certain rather standard types and characteristics. Some of these were good enough to persist in spite of recognized faults and it has been my purpose in my present concept to hold to that which was valuable in the old and accepted types, while establishing my new and improved type on a basis to make it commercially available for scientific or like fields. In schools and colleges first costs of laboratory equipment are an essential factor and breakage is necessarily high. I have attempted to meet this by a reduced cost basis of production while providing a relatively more rugged and still more efficient and convenient article based upon and therefore readily adapted to established usages and practices.

According to my concept as applied to devices of the condenser type, one of the sources of difficulty lay in what I may term the extravagance of the adapter end. The other like difficulty lay at the discharge end. Each contributed to cost and therefore a price basis on what may be termed an overall measure or length of such a piece of apparatus.

I have attempted to illustrate this development in the accompanying drawings and will more particularly describe in the following specification my improvements and their advantages.

From these any one skilled in this old and well traditioned art will find guidance for the solution of their special production needs and the demands of the users and consumers of such fragile devices. They provide for new and more economical and efficient scientific apparatus and in times when efficiency and economy are urgently important.

In the drawings I have shown a simple but highly efficient form of a condenser in accordance with my invention, and in these drawings:

Fig. 1 is a general view showing a condenser according to my invention in a conventional set up.

Fig. 2 is a sectional view of one of my condensers, shortened by an indicated break away of the median section.

Figs. 3 and 4 are transverse sections on the lines 3—3 and 4—4, respectively, indicated on Fig. 2.

Fig. 5 is a longitudinal sectional view broken away for shortening and illustrating a condenser of modified form but in accordance with my invention.

Fig. 6 is a longitudinal section of a fragment of a double walled article according to my invention.

Fig. 7 is a similar view of a triple walled double chambered article of similar character.

Fig. 8 is a transverse sectional view on the line 8—8, of Fig. 6, and

Fig. 9 is a similar transverse section on the line 9—9 of Fig. 7.

The condenser shown as illustrative of my invention consists of an outer tubular shell or casing 1 provided at one end with an adapter portion 2 and having its opposite end 3 extended for entry through a stopper into any receiver as indicated at R in Fig. 1.

Through this outer shell or casing extends a condenser tube 10 of slightly less diameter than 1 and spaced from it slightly to form around the condenser tube a water jacket 11.

The condenser tube is extended through the adapter as at 12 and ring sealed to the outer adapter portion 2 so as to form a continuation $11^1$ of the water jacket 11.

The tube 10 extends out to the end of the portion 3 and is sealed to it by a fused joint 4 which constitutes a thickened or reinforced terminal providing for easy and safe penetration of the aperture of a stopper or like member.

At its adapter end the fused-over joint 5 makes a reinforcement for the mouth 6 of the adapter adding strength to this end of the condenser as well as spacing the walls of the water jacket extension $11^1$.

The water jacket is supplied through an intake nipple or rubber hose connection 7 and has its outlet as at 8 in the adapter portion. The condenser is thus water jacketed for its full length which provides greatly increased efficiency for its size. I also preferably make the water jacket comparatively shallow in contrast with the older types in which the condenser barrel was usually of larger diameter than the adapter. This not only makes possible a great economy in tubing stock, but my shallow water jackets provide for a more intimate and rapid flow and therefore better condensation. The smaller barrelled condenser is also more economical for the user as the relatively small clamp C of any desired type is less expensive than a larger one such as would be required to hold the larger barrelled old type of condenser.

In the modified form of condenser shown in Fig. 5 I have provided at 21 an outer tubular shell forming the outside of the water jacket. In this form the shell 21 is of uniform diameter throughout its length.

The inner or condenser tube 22 is formed with an enlarged adapter end 25 which is sealed by fusing to the outer tube 21 as at 25¹, the thickened end reinforced and being formed as a mouth or lip 26. At its discharge end this type of condenser may be carried through an end wall as at 23 drawn down from the outer tube or shell 21 and sealed as at 23¹ by fusion to the condenser tube 22 near its discharge end 24 which is beveled off or otherwise finished for insertion through the opening of a flask stopper or the like.

This forms between the outer tubular casing 21 and the inner condenser tube 22 a water jacket extending the entire length of the adapter end and almost down to the discharge end only leaving room enough for discharge connection. The water jacket or chamber 21¹ is provided with an intake nipple 27 for receiving a rubber connecting tube and a discharge nipple 28 for receiving a similar tube connection.

In Fig. 6 I have shown a double walled article of concentric tubular stock in which an outer tube 31 is sealed to an inner tube 32 by fusion of the ends of the glass manipulated to form a thickened portion 36 which may be apertured at 37 for the reception of any desired connection. For example, in the construction of double walled tubes in which the chamber contains a gas, whether for color effect or for insulation, the chamber 38 is available for such gas which may be introduced and held therein as desired, as for example in such tubular constructions for use in neon or like lamps.

In Fig. 7 I have illustrated a double chambered wall formed by triple concentric tubing 41, 42, 43, fused together and manipulated into a thickened and reinforced end as at 46. This may be provided with any kind of an aperture 47 desired for the purpose to which the chambered tube is put.

Condensers and like articles having plural annular walls forming chambers according to my inventions may be formed up from tubing of any desired cross section and of any fusible or moldable material capable of being plasticized by heat and capable of being manipulated while plastic into a heavy fused reinforcing bond. Such tubing might be of boro silicate, sodium lime or lead glass or glass of the so-called fused quartz type or synthetic materials or condensation products plasticizable under heat and fusible as above specified.

The sealing of the tube ends which are worked to provide reinforcements make the condensers very strong and resistant to the breakage tendencies of hard laboratory service.

Various modifications may of course be made in design and proportion for different uses without departing from the spirit of my inventions.

What I therefore claim and desire to secure by Letters Patent is:—

1. A condenser comprising a condenser tube, a cooling jacket surrounding the tube, and an enlarged adapter within said cooling jacket, said adapter forming an extension of the condenser tube and having an unrestricted mouth of greater diameter than the main portion of the condenser tube.

2. The condenser of claim 1, the ends of said condenser tube and cooling jacket being fused to each other to provide reinforced seats.

3. The condenser of claim 1, the end of the condenser tube remote from the adapter extending beyond the adjacent end of the cooling jacket as a discharge.

4. A condenser comprising a condenser tube, an enlarged open mouth adapter formed as an extension of said tube, an enclosing shell spaced from said tube and adapter and sealed thereto at its ends and providing therewith a continuous cooling jacket surrounding said tube and adapter for substantially the entire length thereof, and inlet and outlet connections to said cooling jacket adjacent the ends thereof, one of said connections being opposite the adapter.

WILLIAM T. LEVITT